US012271180B2

(12) United States Patent
Hickox et al.

(10) Patent No.: US 12,271,180 B2
(45) Date of Patent: Apr. 8, 2025

(54) INTERLACING DATA IN STREAMING INDUSTRIAL IMAGE DATA

(71) Applicant: Rockwell Automation Technologies, Inc., Mayfield Heights, OH (US)

(72) Inventors: Stephen L. Hickox, Middlefield, OH (US); Bryan W. Barnett, Richmond Heights, OH (US); Abhishek Mehrotra, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 368 days.

(21) Appl. No.: 17/828,956

(22) Filed: May 31, 2022

(65) Prior Publication Data

US 2023/0384763 A1 Nov. 30, 2023

(51) Int. Cl.
*G05B 19/4155* (2006.01)
*G06K 7/14* (2006.01)
*G06K 19/06* (2006.01)

(52) U.S. Cl.
CPC ....... *G05B 19/4155* (2013.01); *G06K 7/1417* (2013.01); *G06K 19/06028* (2013.01); *G06K 19/06037* (2013.01); *G05B 2219/31449* (2013.01)

(58) Field of Classification Search
CPC ...... G05B 19/4155; G05B 2219/31449; G06K 7/1417; G06K 19/06028; G06K 19/06037
See application file for complete search history.

(56) References Cited

U.S. PATENT DOCUMENTS

| 11,064,149 | B1* | 7/2021 | Paun | H04N 21/8133 |
| 2009/0010620 | A1* | 1/2009 | Hatabu | H04N 7/08 |
| | | | | 386/E5.002 |
| 2018/0052835 | A1* | 2/2018 | Billi-Duran | G06F 16/487 |
| 2023/0008710 | A1* | 1/2023 | Fee | H04N 21/44008 |

* cited by examiner

*Primary Examiner* — Michael W Choi
(74) *Attorney, Agent, or Firm* — Fletcher Yoder, P.C.

(57) ABSTRACT

A system may include a control system for controlling one or more operations of one or more industrial devices in an industrial system. The control system may receive streaming data comprising one or more visualizations representative of one or more live operational parameters associated with one or more industrial devices. The streaming data may include multiple image frames. The control system may also identify multiple datasets associated with the streaming data and generate multiple machine-readable images based on the multiple datasets. In addition, the control system may embed the multiple machine-readable images within the multiple image frames of the streaming data to generate updated streaming data and send the updated streaming data to a computing system that may extract the multiple machine-readable images from the updated streaming data.

20 Claims, 9 Drawing Sheets

INTERLACING DATA IN STREAMING INDUSTRIAL IMAGE DATA

BACKGROUND

The present disclosure generally relates to providing remote monitoring of equipment operations. More specifically, the present disclosure is related to systems and methods for providing multiple users across an organization with remote accesses to live data updates related to various equipment or devices of a system.

Users (e.g., plant operators, maintenance personnel) may prefer to have access to live data related to current operating conditions of various equipment and devices of industrial systems. However, providing live data access to multiple individuals or entities may involve increased cybersecurity measures for reducing potential risks of the live data that may be compromised by access via unauthorized personnel (e.g., hackers). Moreover, sending raw live data to the users for remotely monitoring a large amount of equipment and devices may consume a significant portion of network bandwidth, resulting in various issues such as data latency, communication bottleneck, and increased data risk or network cost.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a control system configured to control one or more operations of one or more industrial devices in an industrial system. The control system may receive streaming data comprising one or more visualizations representative of one or more live operational parameters associated with one or more industrial devices. The streaming data may include multiple image frames. The control system may also identify multiple datasets associated with the streaming data and generate multiple machine-readable images based on the multiple datasets. In addition, the control system may embed the multiple machine-readable images within the multiple image frames of the streaming data to generate updated streaming data and send the updated streaming data to a computing system configured to extract the multiple machine-readable images from the updated streaming data.

In another embodiment, a method using a control system may include receiving streaming data comprising one or more visualizations representative of one or more live operational parameters associated with one or more industrial devices in an industrial system. The streaming data may include multiple image frames. The method may also include identifying multiple datasets associated with the streaming data and generating multiple machine-readable images based on the multiple datasets. In addition, the method may include embedding the multiple machine-readable images within the multiple image frames of the streaming data to generate updated streaming data and sending the updated streaming data to a computing system.

In yet another embodiment, non-transitory, computer-readable medium storing instructions that, when executed by one or more processors, cause the one or more processors to perform operations including: receiving streaming data that includes multiple image frames via a network; extracting multiple machine-readable images corresponding to a portion of the multiple image frames from the streaming data; determining one or more data values corresponding to one or more live operational parameters associated with one or more industrial devices based on the multiple machine-readable images extracted from the streaming data; and storing the one or more data values in a database.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
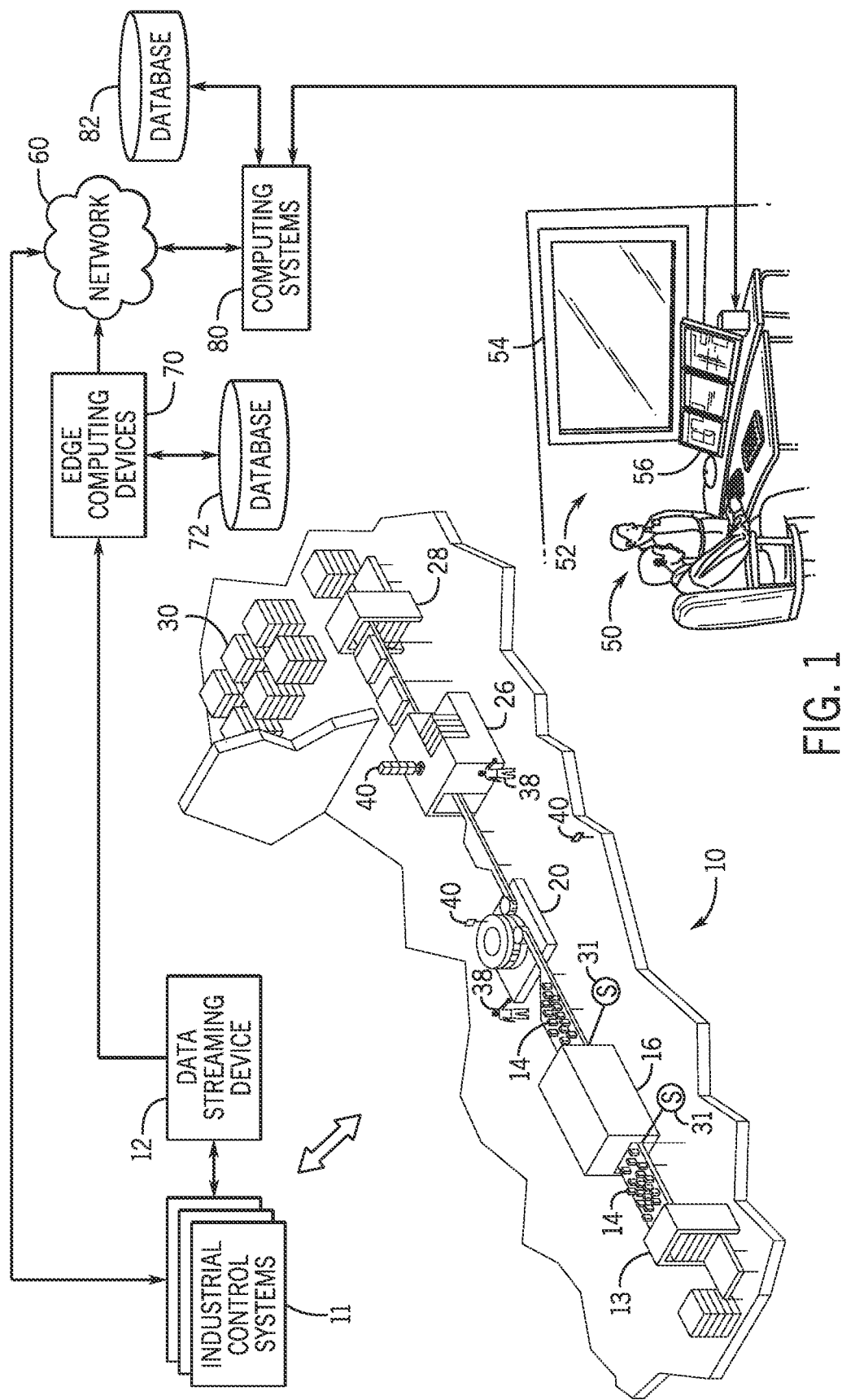
FIG. 1 illustrates an example industrial automation system controlled by one or more industrial control systems and monitored by users via a data streaming device, in accordance with an embodiment presented herein.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Organizations (e.g., plants) may prefer to provide access to live data related to current operating conditions of various equipment and devices of industrial systems for multiple individuals or entities (e.g., plant operators, maintenance personnel) across the organizations. Such live data access may enable the individuals to monitor operations of the equipment and devices in real time and to provide remote control or enable remote personnel to provide advice and help trouble shooting operational issues based on the accessed live data. However, providing live data access to the multiple individuals or entities may increase potential risks (e.g., data breach) of the live data being compromised (e.g., accessed) by unauthorized personnel (e.g., third party contractors, hackers). Furthermore, providing remote monitoring of a large amount of equipment and devices of an industrial system by transferring raw live data may involve a significant portion of network bandwidth, resulting in data latency, communication bottleneck, increased network cost, and the like.

Embodiments of the present disclosure are generally directed towards systems and methods for providing multiple users (e.g., individuals or entities) across an organization with remote accesses (e.g., viewing access) to live data updates related to various industrial equipment and devices of an industrial system. For example, an industrial automation system may include certain control systems of the industrial system. The control systems may output image data representative of live datasets associated with operations of the industrial equipment and devices via suitable image data ports, such as High-Definition Multimedia Interface (HDMI) ports. The image data may be provided to a live-streaming device or component, such that the multiple users may view the image data via a live-streaming broadcast. By presenting the live image data, the data available to a recipient may be unstructured (e.g., in a manner that does not include substantive operation-related values of respective industrial equipment and devices). In this way, data security may be enhanced by using pure image data that excludes digital or substantive values (e.g., temperature, pressure) of operation-related values, such that even if the image data is compromised (e.g., hacked), it is difficult to interpret the values presented in the image data or determine the relationship of the values to the equipment presented in the image data. In addition, the live datasets may be viewable by the multiple users but may not be modified or altered by the multiple users. In this way, the industrial equipment and devices may be accessible to the multiple users for view but may not be accessible to unauthorized users for modifications (e.g., editing or writing operation).

With this in mind, in some embodiments, one or more industrial control systems may be communicatively coupled to various industrial equipment and devices of an industrial system (e.g., production line) implemented in a plant (e.g., manufacturing plant). The industrial control systems may monitor and collect live data (e.g., image data, audio data, log data) representative of certain measurement values (e.g., positions, orientations, speeds, temperatures, noise levels, pressures, voltages, currents), operation values (e.g., parameters, settings), and operation statuses (e.g., service logs, status reports, incident reports, warnings, or alerts) associated with operations of the various industrial equipment and devices. The industrial control systems may transmit the collected live data to a data streaming device that may provide live streaming visualizations of the operations of the various industrial equipment and devices. The live streaming visualizations may enable users (e.g., plant operators, maintenance personnel) to view certain live datasets via the live streaming visualizations. For example, a user device (e.g., computing device) may send a request to the data streaming device to view certain live stream visualizations that present plant floor datasets that may correspond to respective operations of certain industrial equipment and devices. The request may include credentials (e.g., user credentials), and based on the received credentials, the data streaming device may determine view access rights associated with the user. The data streaming device may then send a list of equipment and/or devices to the user device, such that the list corresponds to a set of devices that the user's credentials permit access. Based on received user selections (e.g., selecting a device, selecting a visualization associated with the selected device), the data streaming device may route streaming image data associated with the selected visualization to the user device for further applications (e.g., data analysis, data processing). Additional details with regard to providing live streaming visualizations of industrial equipment operations using the data streaming device will be discussed below with reference to FIGS. 3 and 4.

In some embodiments, after receiving streaming data from a data streaming device, the user device or other suitable computing system may extract historical data from the streaming data based on identified data fields (e.g., temperature, pressure) over a time period. For example, the streaming data may include image data consisting of image frames and audio data consisting of audio packets. The computing system may associate audio packets with image frames and extract portions of the image frames based on certain identified data fields (e.g., temperature, or pressure) that may vary over a time period. Such identification may utilize optical character recognition (OCR) technology to extract data from the image data (e.g., streaming video). The computing system may acquire data field values (e.g., temperature or pressure reading) from the extracted portions of the image frames. Furthermore, the computing system may identify audio packets corresponding to the image frames associated with the extracted portions. The acquired data field values and the identified audio packets may be stored as time series data in a database for further applications (e.g., data analysis, fault identification, alerting, or recommendation). In this way, unstructured data, such as the image data presented via the live stream visualizations may be captured and stored in a structured format for further data processing and analysis. For instance, the computing system may receive time series data from the database and identify certain data trends associated with respective equipment or devices based on received time series data. The computing system may also predict certain operational parameters of the respective equipment or devices based on identified trends. If a predicted operational parameter (e.g. predicted pressure) of an equipment (e.g., a tank) is outside an expected range (e.g., predetermined range based on historical operational values measured by pressure sensors), the computing system may send corresponding commands to the equipment to adjust operations (e.g., to prevent over pressure). Additional details with regard to extracting historical data and identifying data trends from the streaming image data will be discussed below with reference to FIGS. 5 and 6.

In certain embodiments, a control system (e.g., industrial control system) may receive datasets (e.g., substantive data, measurement, and digital values) from operation equipment or devices of an industrial system. Based on the received datasets, the control system may generate certain machine-readable images (e.g., a bar code) and interlace the machine-readable images with streaming image data provided to users for view via a data streaming device. Such interlaced machine-readable images may not be perceivable by the user, whereas a viewing device (e.g., computer, tablet) displaying the streaming image data may be capable of detecting the interlaced machine-readable images (e.g., by sampling the streaming image data at a specific rate). In this way, additional information may be embedded within image frames of the streaming image data and provided to the user. In some cases, interlaced data may be used to prevent data loss caused by network issues. For example, certain network conditions, such as a transmitting device losing network connectivity, may cause missing image frames from the streaming image data. Using interlacing data technique described above, a buffer of image datasets (e.g., a gather of high-density image datasets consisting of machine-readable images) may be interlaced within the streaming image data, such that any missing image frames may be accounted for and retrieved from one or more neighboring image frames. In this way, the control system may utilize the machine-readable images interlaced with the streaming image data to ensure that the streaming image data may provide expected image datasets to the user during occurrences of various network issues. Additional details with regard to interlacing data in streaming image data will be discussed below with reference to FIGS. 7-9.

By way of introduction, FIG. 1 illustrates an example industrial automation system 10 controlled by one or more industrial control systems 11 and monitored by users 50 (e.g., plant operators from a control room 52) via a data streaming device 12. The present embodiments described herein may be implemented using the various equipment, devices, and machines illustrated in the industrial automation system 10 described below. However, it should be noted that although the example industrial automation system 10 of FIG. 1 is directed at a beverage packaging plant, the present embodiments described herein may be employed within any suitable industry or industrial segments, such as processing, refining, automotive, mining, power generation, hydrocarbon production, manufacturing, and the like. The following brief description of the example industrial automation system 10 employed by the beverage packaging plant is provided herein to help facilitate a more comprehensive understanding of how the embodiments described herein may be applied to industrial equipment, devices, and machines to significantly improve the operations of the respective industrial automation system. As such, the embodiments described herein should not be limited to be applied to the example depicted in FIG. 1.

As depicted, the industrial automation system 10 includes stations having equipment, devices, machines, and/or machine components to conduct a particular application within an automated process, for example, a beverage packaging process. The automated process may begin at a station 13 used for loading objects, such as empty cans or bottles to be filled, into the industrial automation system 10 via a conveyor section 14. The conveyor section 14 may transport the objects to a station 16 to perform a first action, for example, washing the empty cans and/or bottles. As objects exit from the station 16, the conveyor section 14 may transport the objects to a station 20, such as a filling and sealing station, in a single-file line. A second conveyor section 14 may transport objects from the station 20 to a station 26. After the objects proceed through the various stations, the objects may be removed from the station 28, for example, for storage in a warehouse 30.

It should be noted that, for different applications, the particular system, equipment, devices, machines, and/or machine components, may be different or specially adapted to the respective application. In some embodiments, the industrial automation system 10 may include a variety of equipment that may perform various operations as part of an industrial application. For example, industrial automation system 10 may include electrical equipment (e.g., electric motors, generators, fans, transformers, or regulators), hydraulic equipment (e.g., hydraulic pumps, tanks), compressed air equipment (e.g., compressors, condensers), steam equipment (e.g., boilers), mechanical equipment (e.g., lathes, milling machines), protective equipment, refrigeration equipment (e.g., coolers), heating equipment (e.g., heaters), combustion equipment (e.g., engines), power lines, hydraulic lines, steam lines, and the like. Some example types of equipment may include mixers, machine conveyors, tanks, skids, specialized original equipment manufacturer machines, and the like.

In some embodiments, the industrial automation system 10 may include a variety of machines and devices to perform various operations in a compressor station, an oil refinery, a batch operation for making food items, a mechanized assembly line, and so forth. Accordingly, the industrial automation system 10 may comprise a variety of operational devices, machines or machine components, such as valves, actuators, meters, panels, network devices (e.g., switches, hubs, routers, gateways, modems), computing devices (e.g., microprocessor computers), communication devices (e.g., transceivers, transmitters, receivers), wheels, axles, shafts, wedges, joints, or a myriad of machinery or devices used for manufacturing, processing, material handling, or other types of applications.

In some embodiments, the variety of equipment, machines, and devices described above may include industrial automation devices or components that are used to automatically perform certain operations (e.g., manufacturing, assembling, packaging, or testing). The industrial automation devices or components may include various types of devices or components that may be used to perform various operations that may be part of an industrial application. For example, the industrial automation devices or components may include electrical devices, hydraulic devices, compressed air devices, steam devices, mechanical tools, protective devices, refrigeration devices, power lines, hydraulic lines, steam lines, and the like. Some example types of the industrial automation devices or components may include industrial robots, automation cells, conveyors, lifters, turn-over machines, mixers, tanks, skids, specialized original equipment manufacturer machines, input/output (I/O) modules, motors, human machine interfaces (HMIs), operator interfaces, contactors, starters, actuators, drives, relays, protection devices, switchgear, compressors, firewall, network switches (e.g., Ethernet switches, modular-managed, fixed-managed, service-router, industrial, unmanaged, etc.), and the like.

In some cases, the industrial automation devices or components may be communicatively coupled to monitoring or controlling devices that may monitor or control the operations of the respective industrial automation devices or components. The monitoring or controlling devices may include, for examples, local controllers (e.g., motor drive controllers, robot controllers, conveyor controller, lifter controllers), sensing devices (e.g., various sensors, gauges, flow meters) that are capable of measuring different properties (temperature, pressure, sound, light, voltage, flow, current, stress, speed, position, or orientation) of the coupled industrial automation devices or components. The industrial automation devices or components may receive data (e.g., commands, instructions) from the coupled devices and perform respective operations based on the received data. For example, a controller of a motor drive may receive temperature data regarding a temperature of a connected motor and may cause the motor drive to adjust operations of the motor based on the temperature data.

The one or more industrial control systems 11 may be communicatively coupled, for example, via the monitoring/controlling devices or components described above, to the respective industrial automation devices or components. One or more properties of the industrial automation devices or components may be monitored (e.g., via the sensing devices) and controlled (e.g., via the local controllers) by the one or more industrial control systems 11 for regulating control parameters and/or variables. For example, the one or more industrial control systems 11 may use a variety of sensing devices (e.g., sensors 31) employed in different locations within the industrial automation system 10 to monitor the one or more properties of the industrial automation devices or components. The sensors 31 may include any suitable sensors, such as temperature sensors, pressure sensors, acoustic sensors, optical sensors, voltage sensors, current sensors, stress sensors, speed or velocity sensors, position sensors, orientation sensors, and so forth.

The one or more industrial control systems 11 may use the local controllers (e.g., robot controllers, conveyor controller, or lifter controllers) to control operations of the industrial automation devices or components based on certain inputs, such as input from the sensor 31, input from onsite users 38 (e.g., maintenance personnel), or input from remote users (e.g., the users 50). In one embodiment, the one or more industrial control systems 11 may receive sensing data regarding a temperature of an electrical motor from a temperature sensors associated to the electrical motor. The one or more industrial control systems 11 may send a command to a motor driver to adjust the motor speed based on the temperature. In one embodiment, the one or more industrial control systems 11 may determine a fault associated with a conveyor based on positions (e.g., horizontal and vertical positions) of the conveyor measured by a Light Detection and Ranging (LiDAR) device and relevant acoustic measurement (e.g., noise pattern) of the conveyor measured by acoustic sensors. Based on the determined fault, the one or more industrial control systems 11 may cause a conveyor controller to suspend operations of the conveyor for further diagnose or trouble shooting. Additionally, the one or more industrial control systems 11 may adjust corresponding operations of other equipment, devices, or machines (e.g., at the station 16 or the station 20) that may be related to the operations of the conveyor.

In certain cases, audio devices 40 may be used to assist the onsite users 38 in remotely controlling or monitoring the industrial automation devices or components (e.g., while located away from respective control panels of the local controllers or the control room 52) via verbal or audible commands. The audio device 40 may perform actions in response to verbal or audible commands of the onsite users 38. For instance, the audio devices 40 may interpret the audible commands, determine corresponding commands for respective industrial automation devices or components, and adjust the operations of the respective industrial automation devices or components based on the determined commands. In this way, the onsite users 38 may physically input a change to operations of a first machine via an interface of the first machine, while using the audio device 40 to change operations of a second machine using verbal or audible commands without physically accessing the second machine. For example, the onsite users 38, while at the station 26 may verbally request an audio device of the audio devices 40 to report on or change an operation of the station 28 while physically located away from a control panel for the station 28.

The one or more industrial control systems 11 may include programming objects (e.g., software, firmware) that may be instantiated and executed to provide operation controls as described above, visualizations representative of live operational parameters of corresponding industrial automation devices, and simulated functionalities (e.g., via digital representations of the corresponding industrial automation devices) similar or identical to the actual industrial automation devices. The programming objects may include code and/or instructions stored in memory circuitry of the one or more industrial control systems 11 and executed by processing circuitry of the one or more industrial control systems 11. The processing circuitry may communicate with the memory circuitry to permit a storage of relevant datasets (e.g., the visualizations).

In some embodiments, the one or more industrial control systems 11 may generate the visualizations of representative of live operational parameters of corresponding industrial automation devices based on signals (e.g., analogue measurement) or datasets (e.g., digitalized measurement) transmitted from the sensors 31. In some embodiments, the visualizations of corresponding industrial automation devices may be based on image data, such as images of control panels, dashboard visualizations, operational visualizations, and other types of visualizations of the local controllers directly generated from the local controllers or indirectly generated from certain sensing devices (e.g., cameras) that are monitoring the control panels of the local controllers.

In some embodiments, the visualization of corresponding industrial automation devices may be combined or enhanced (e.g., augmented) with other relevant visualizations (e.g., visualizations based on simulations by digital representations of the corresponding industrial automation devices). In some embodiments, the visualizations of corresponding industrial automation devices may be generated based on holographic images (e.g., three dimensional view combined with multi-dimensional measurement) associated with the corresponding industrial automation devices.

As mentioned above, the one or more industrial control systems 11 may generate datasets (e.g., image datasets) related to various aspects (e.g., operations, software, firmware, or maintenance) of the variety of equipment, devices, and machines communicatively coupled to the one or more industrial control systems 11. For example, the datasets may include machine-readable images (e.g., Quick Response (QR) codes) containing information related to updates in operations, firmware, or maintenance history associated with respective equipment, devices, and machines. In some cases, the machine-readable images may include additional information of other equipment, devices, and machines that may be related to the respective equipment, devices, and machines (e.g., implemented upstream and/or downstream with respect to the respective equipment, devices, and machines). In some embodiments, the one or more industrial control systems 11 may interlace the machine-readable images with streaming image data generated by the data streaming device 12. The interlaced data may be provided to the users 50 for view and to a computing systems for data extraction and analysis.

The data streaming device 12 may be referred to as an electronic device that receives a various types of data (e.g., video, audio, logs) and streams the data, such that user devices (e.g., computer monitors, screens, displays of mobile devices, smart TVs) may present the data via a live streaming service. The data streaming device 12 may be connected to one or more networks (e.g., intranet, internet) through various connections, such as Ethernet cables and/or Wi-Fi access points. Users (e.g., the users 50) may access streaming data via the user devices with certain agreements (e.g., publisher-subscriber agreements). Such agreements may include certain security protocols (e.g., governing data access rights) to enforce data privacy and/or data security.

The term "streaming" used herein may be referred to as continuous (e.g., with no beginning or end) data streams that provide a constant feed of data allowing the users to utilize live streaming data without delays (e.g., delays caused by data downloading). The live streaming data may be created by streaming devices (e.g., the data streaming device 12) using data generated by various sources (e.g., industrial automation devices, local controllers, sensing devices) in various formats (e.g., audio, video, log files) and volumes. That is, the streaming devices may aggregate the data from the various sources into seamlessly real-time data that allows the users to utilize and act upon the live streaming data in a real time and secured manner. Moreover, the live streaming data may not be stored in the industrial control systems 11, the data streaming device 12, or the recipient devices to allow for efficient (e.g., reduced network bandwidth) presentation of the data.

In some embodiments, the one or more industrial control systems 11 and the data streaming device 12 may be communicatively coupled to other devices that include one or more displays 54 (e.g., conventional displays, augmented reality displays, holographic displays) and human machine interfaces (HMI) 56 (e.g., touchscreens, touchpads, keyboards) via a network 60. For example, the users 50 (e.g., plant operators) may view the streaming image data via the one or more displays 54 located in a remote location (e.g., the control room 52), and may interact with (e.g., analyze) the streaming image data via the human machine interfaces 56. The users 50 may use certain computing systems or devices (e.g., control consoles) to send commands, via the network 60, to the local controllers based on the streaming image data that indicates certain changes to operating environment, the industrial automation devices or components, process variables associated with the industrial automation system 10, and the like. For example, the streaming image data may indicate that one or more operation parameters (e.g., motor speed, valve pressure) are outside expected ranges (e.g., predetermined speed or pressure range based on historical data). Based on the received commands, the local controllers may cause (e.g., by changing operation settings or parameters) the connected industrial automation devices or components (e.g., motor, valve) to adjust operations (e.g., change valve setting to prevent over pressure) in response to the changes indicated in the streaming image data. In certain cases, the users 50 may coordinate with the onsite users 38. For example, the users 50 may send verbal commands, via the audio devices 40, to the onsite users 38 to change certain operation settings of equipment at one or more stations (e.g., station 26 or 28).

In some embodiments, one or more edge computing devices 70 may be employed between the data streaming device 12 and the network 60. One or more databases 72 may be connected to the one or more edge computing devices 70 to facilitate data storage related to edge computing. As mentioned previously, visualizations of industrial automation devices generated by the one or more control systems 11 may be combined or enhanced (e.g., augmented) with other relevant visualizations, such as visualizations based on simulations by digital representations (e.g. digital avatars) of corresponding industrial automation devices. In some cases, the digital representations may be locally installed in the one or more control systems 11. While in other cases, the digital representations may be remotely installed in the one or more edge computing devices 70, such that computing resources (e.g., processing circuitry, memory circuitry) of the one or more control systems 11 can be utilized more efficiently for operation control. Moreover, by performing edge computing (e.g., simulations) at locations near data sources (e.g., industrial automation devices or components, local controllers, sensing devices), use of the one or more edge computing devices 70 may reduce an amount of data to be processed in a site (e.g., remote data center, cloud). Additionally, or alternatively, the one or more edge computing devices 70 may transmit data between a local network (e.g., network including the industrial automation system 10, the one or more control systems 11, and the data streaming device 12) and a cloud (e.g., network 60). The one or more edge computing devices 70 may translate protocols or languages associated with data and used by local systems or devices into protocols or languages used by the cloud where the data may be further processed.

In some embodiments, one or more computing systems 80 and one or more databases 82 may be used to analyze and process the live streaming data. The one or more computing systems 80 may include computing systems operated by an organization (e.g., a manufacturing plant) and additional computing systems operated by one or more additional entities (e.g., contractors). The one or more computing systems 80 may include any suitable computing devices (e.g., servers) equipped with various processors, storage devices, input/output devices, displaying devices, communication devices, software related to data analysis, processing, simulation, or the like.

The one or more computing systems 80 may be cloud-based computing systems. For example, at least a portion of the one or more computing systems 80 and/or the one or more databases 82 may be connected to other computing systems and/or databases (e.g., within the network 60) to form a larger scale computing network to perform cloud-based computing, such as large-scale modeling or simulations that may use a vast amount of data collected from multiple industrial systems. Such cloud-based computing may provide insightful information (e.g., predictions) for a large-scale industrial operation (e.g., a complete industrial supply-manufacturing-inspection-shipping chain) associated with an organization.

Although one data streaming device 12 is depicted, it should be understood that any suitable number of data streaming devices may be used in a particular industrial automation system 10 embodiment. For instance, multiple data streaming devices may be implemented in a large-scale industrial operation (e.g., a complete industrial supplymanufacturing-inspection-shipping chain) associated with an organization, including a supply system, a manufacturing system, an inspection system, a shipping system, and so on. For each system of the large-scale industrial operation, one or more data streaming devices may be used the enable multiple users remotely monitor various aspects (e.g., operations, software, firmware, or maintenance) associated with individual systems, adjust corresponding operations based on the monitored data (e.g., live streaming data), coordinate certain operations related to cooperation(s) between different systems, and the like.

In certain cases, industrial data, such as image data associated with industrial equipment and devices, may be provided to displays (e.g., electronic displays, meters, or panels) present on the industrial equipment or devices located in certain locations (e.g., plant floors). The industrial data may include visualizations that are not presented on other display located in remote areas away from the certain locations having the equipment or devices installed. In such cases, the industrial data may be provided to a live-streaming device or component, such that the industrial data may be pushed to users in the remote areas via a digital channel as a live-streaming broadcast.

The live-streaming device or component, such as the data streaming device 12, may be any type of electronic device capable of aggregating various data (e.g., video, audio, logs) into a processing unit (e.g., processor) and seamlessly streaming the data (e.g., via live-stream broadcast) onto remote user devices (e.g., monitors, screens, displays, TVs). Users (e.g., the users 50) may access live streaming data via the user devices with certain agreements (e.g., publisher-subscriber agreements) containing one or more security protocols (e.g., related to user access rights to the live streaming data). As such, the users may utilize the live streaming data without delays (e.g., delays caused by data downloading), therefore acting upon the live streaming data in a real time and secured manner.

The data streaming device 12 may provide a variety of functions that include, but are not limited to, accessing one or more industrial systems (e.g., the one or more industrial control systems 11), one or more devices (e.g., e.g., the one or more edge computing devices 70), and one or more networks (e.g., the network 60), or the like; selectively receiving data including image data containing multiple visualizations each representative of one or more live operational parameters of one or more devices in an industrial system (e.g., the industrial automation system 10); and aggregating the data from selected data sources into seamlessly live streaming data; pushing (e.g., live broadcasting) the live streaming data to users in a real time and secured manner.

Figure 2:
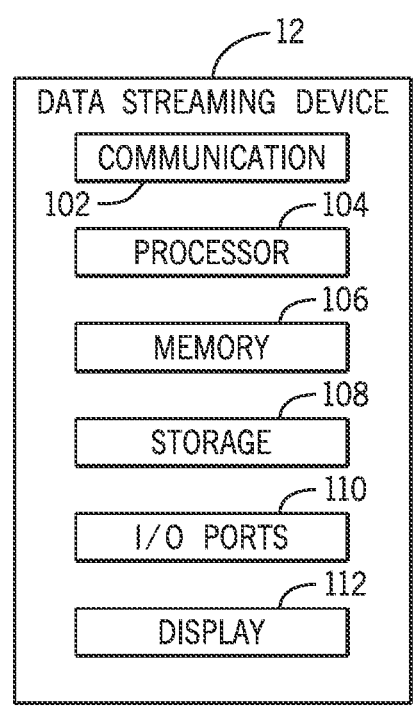
FIG. 2 illustrates example components of the data streaming device of FIG. 1, in accordance with an embodiment presented herein.

By way of example, FIG. 2 illustrates example components of the data streaming device 12 of FIG. 1. The data streaming device 12 may include various types of components that may assist the data streaming device 12 in performing various types of live data streaming tasks. For example, the data streaming device 12 may include a communication component 102, a processor 104, a memory 106, a storage 108, input/output (I/O) ports 110, a display 112, and the like.

The communication component 102 may be a wireless or wired communication component that may facilitate communication between the data streaming device 12 and various other systems (e.g., the one or more industrial control systems 11), devices (e.g., the one or more edge computing devices 70), networks (e.g., the network 60), or the like. For example, the communication component 102 may allow the data streaming device 12 to receive live data from the one or more industrial control systems 11, such as image data, audio data, and log data representative of various measurement values (e.g., positions, orientations, speeds, temperatures, noise levels, pressures, voltages, currents), operation values (e.g., parameters, settings), and operation status (e.g., service logs, status reports, incident reports, warnings, or alerts) associated with operations of the various industrial equipment and devices in the industrial automation system 10. The communication component 102 may receive and send notifications to the user devices (e.g., the one or more displays 54, the human machine interface 56) and other computing systems (e.g., the one or more computing systems 80). The communication component 102 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 104 may process instructions for execution within the data streaming device 12. The processor 104 may include single-threaded processor(s), multi-threaded processor(s), or both. The processor 104 may process instructions stored in the memory 106. The processor 104 may also include hardware-based processor(s) each including one or more cores. The processor 104 may include general purpose processor(s), special purpose processor(s), or both. The processor 104 may be communicatively coupled to other internal components (such as the communication component 102, the storage 108, the I/O ports 110, and the display 112).

The memory 106 and the storage 108 may be any suitable articles of manufacture that can serve as media to store processor-executable code, data, or the like. These articles of manufacture may represent computer-readable media (e.g., any suitable form of memory or storage) that may store the processor-executable code used by the processor 104 to perform the presently disclosed techniques. As used herein, applications may include any suitable computer software or program that may be installed onto the data streaming device 12 and executed by the processor 104. The memory 106 and the storage 108 may represent non-transitory computer-readable media (e.g., any suitable form of memory or storage) that may store the processor-executable code used by the processor 104 to perform various techniques described herein. It should be noted that non-transitory merely indicates that the media is tangible and not a signal.

The I/O ports 110 may be interfaces that may couple to other peripheral components such as input devices (e.g., keyboard, mouse), sensors, input/output (I/O) modules, and the like. The display 112 may operate as a human machine interface (HMI) to depict visualizations associated with software or executable code being processed by the processor 104. In one embodiment, the display 112 may be a touch display capable of receiving inputs from an operator of the data streaming device 12. The display 112 may be any suitable type of display, such as a liquid crystal display (LCD), plasma display, or an organic light emitting diode (OLED) display, for example. Additionally, in one embodiment, the display 112 may be provided in conjunction with a touch-sensitive mechanism (e.g., a touch screen) that may function as part of a control interface for the data streaming device 12.

It should be noted that the components described above with regard to the data streaming device 12 are examples and the data streaming device 12 may include additional or fewer components relative to the illustrated embodiment. For example, the data streaming device 12 may include additional circuitry that may include artificial intelligence circuitry (e.g., neural network circuitry) for provide additional capabilities (e.g., advanced learnings and/or simulations to facilitate data communication, selection, and aggregation).

As mentioned above, in some embodiments, the one or more industrial control systems 11 may monitor and collect live data representative of certain measurement values, operation values, and operation statuses associated with operations of the various industrial equipment and devices. The one or more industrial control systems 11 may transmit the collected live data to the data streaming device 12 that may provide live data streams associated with operations of the various industrial equipment and devices. The live data streams may enable users (e.g., users 50) to interact with user devices (e.g., the one or more displays 54, the human machine interface 56) and other computing systems (e.g., the one or more computing systems 80) to access certain live datasets via the live data streams. In this way, the users may utilize the live streams without delays and be able to act upon the live data streams in a real time manner.

Figure 3:
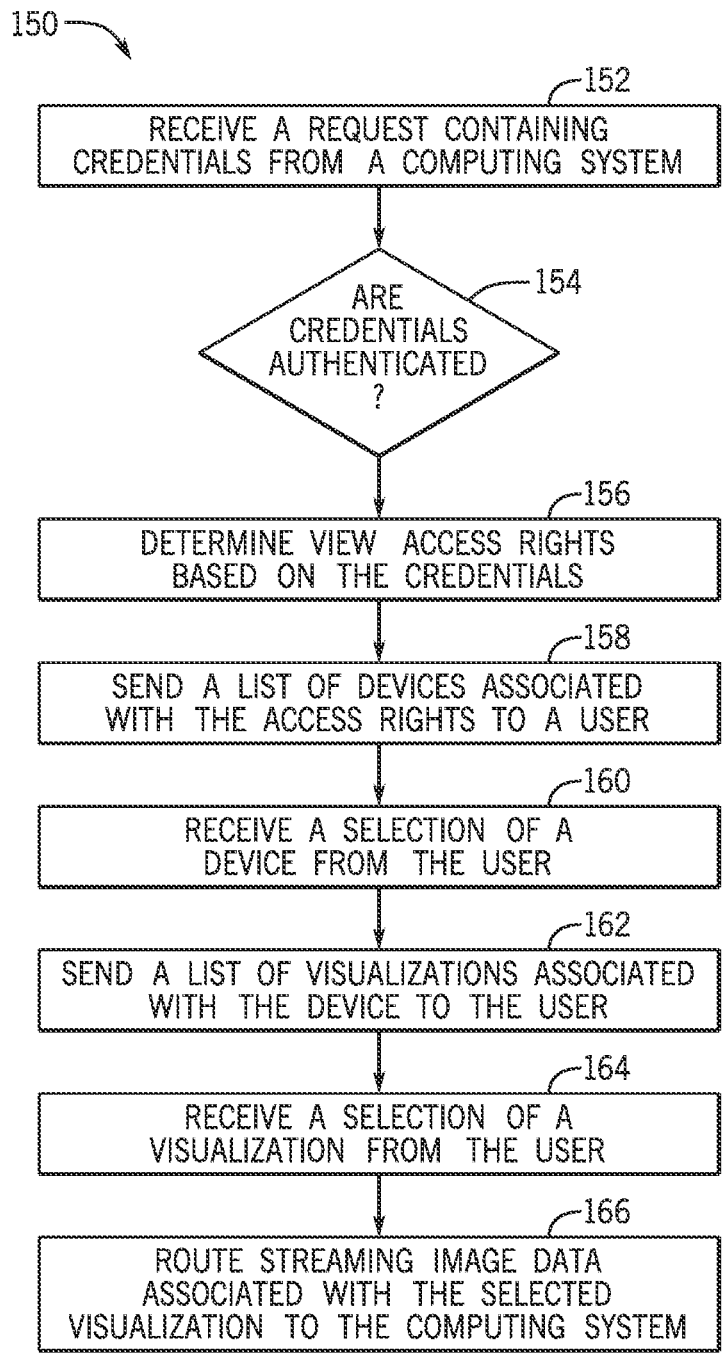
FIG. 3 illustrates a flow chart of an example method for providing live streaming visualizations with access control using the data streaming device of FIG. 1, in accordance with an embodiment presented herein.
Figure 4:
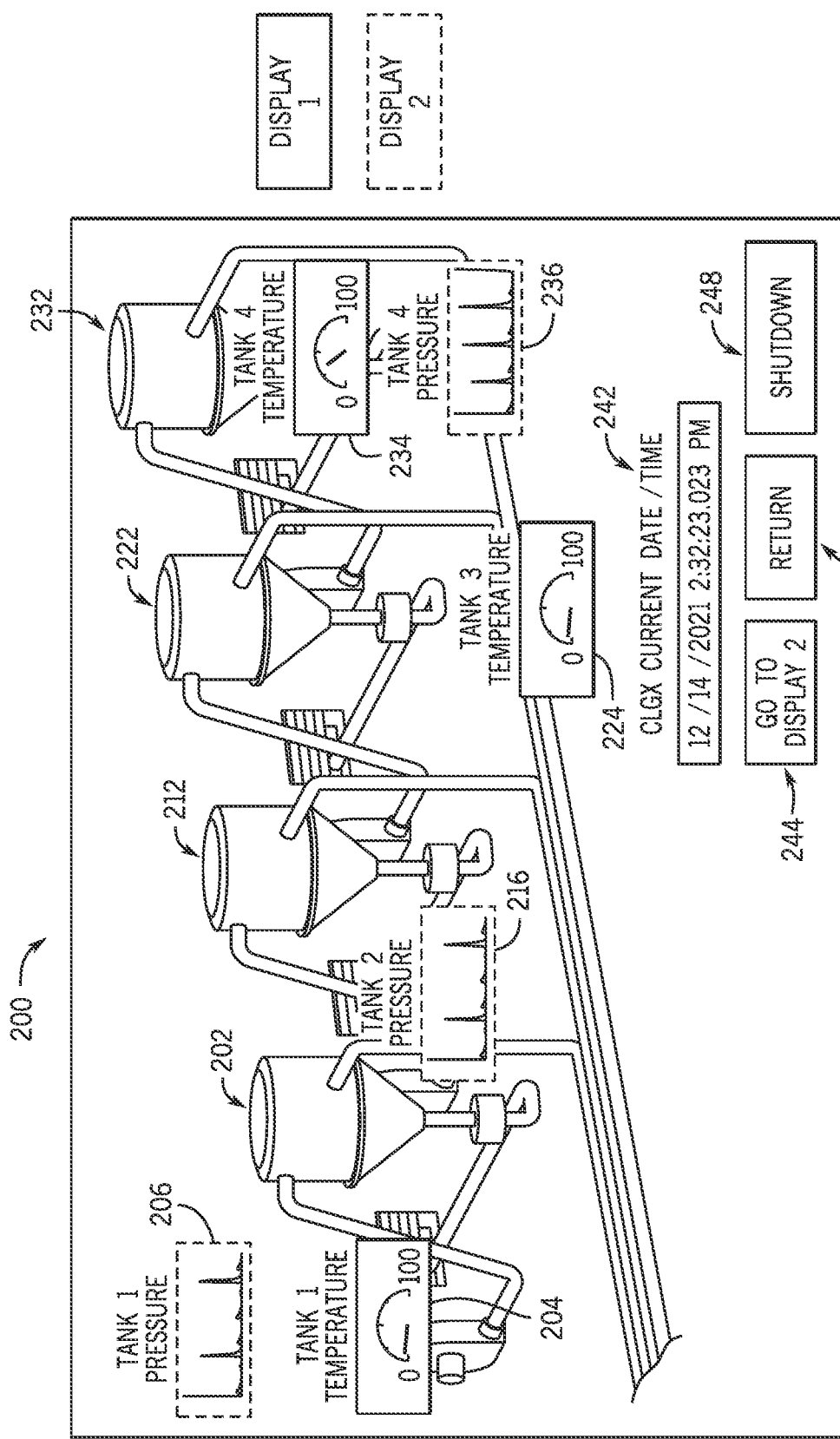
FIG. 4 illustrates example live streaming visualizations based on the method of FIG. 3, in accordance with an embodiment presented herein.

With the foregoing in mind, FIG. 3 illustrates a flow chart of an example method 150 for providing live streaming visualizations using the data streaming device 12 of FIG. 1. The data streaming device 12 may perform operations described below via the processor 104 based on processor-executable code stored in the memory 106 and the storage 108. The processor 104 may execute the processor-executable code to perform operations, such as accessing the one or more industrial control systems 11, the one or more edge computing devices 70, and the network 60; selectively receiving data containing visualizations representative of live operational parameters or other characteristics of one or more devices in the industrial automation system 10; aggregating the received data into seamlessly live streaming data; and broadcasting the live streaming data to users in a real time and secured manner.

Although the method 150 described in FIG. 3 is described in a particular order, it should be noted that the method 150 may be performed in any suitable order and is not limited to the order presented herein. It should also be noted that although each processing block is described below in the method 150 as being performed by the data streaming device 12, other suitable devices may perform the methods described herein.

Referring now to FIG. 3, at block 152, the data streaming device 12 may receive a request containing credentials from a computing system. For example, a user (e.g., plant operator from the control room 52) may send a request for visualizations that corresponds to respective operations of certain industrial equipment and devices. The user may send the request via a user device (the human machine interface 56) that may interact with the computing system (e.g., one of the one or more computing systems 80), the edge computing devices 70, the data streaming device 12, the industrial control system 11, or the like. The request may include the credentials, such as user credentials (e.g., username, user identification number, facial image data, biometric data, and the like). In some embodiments, the credentials may be related to account information, password data, authentication data, and other types of data to determine view access rights associated with the credentials. The credentials may also provide subscription information that details the view access rights available to the user. In some embodiments, the credentials may include additional data, such as system or device identification data (e.g., MAC address and/or IP address of the computing system or the user device). Such credentials may facilitate the data streaming device 12 to authenticate the user sending the request. Indeed, the credentials may be provided or stored in a memory of the data streaming device 12 and may detail different types of visualizations, datasets, and other information that each respective user may be able to access and view. In this way, information pertaining to the industrial automation system 10 may be limited to those individuals that may have been vetted or authorized to view such data.

The data streaming device 12 may receive the request containing the credentials from the computing system. Based on the received credentials, at block 154, the data streaming device 12 may determine whether the credentials are authenticated. For example, the data streaming device 12 may query, via the processor 104, a database stored in the storage 108, for user authentication data (e.g., usernames, passwords, and user identification numbers pre-authenticated and stored in the database). The data streaming device 12 may determine whether the received credentials match with the user authentication data in the database. Additionally, or alternatively, the data streaming device 12 may examine the additional data (e.g., system or device identification data) included in the received credentials by querying the database to determine whether the additional data match with system or device related authentication data pre-authenticated and stored in the database. Based on the determinations described above, the data streaming device 12 may determine whether the credentials are authenticated.

After the credentials are authenticated, at block 156, the data streaming device 12 may determine view access rights based on the authenticated credentials. For example, the data streaming device 12 may determine the view access rights associated with the user by querying the database stored in the storage 108 for access right data based on the authenticated credentials. The access right data may specify type(s) of data (e.g., image data, audio data) accessible by the user, contents of data (e.g., limited data contents, devices, visualizations, etc. based on the user credentials) accessible by the user, and the like. The data streaming device 12 may determine the view access rights based on the access right data and the request. For instance, the user may send the request for accessing plant floor datasets associated with visualizations corresponding to operations of the station 16 (e.g., washing station) and the station 20 (e.g., filling and sealing station) or a portion of the industrial automation system 10. After authenticating the credentials of the user, the data streaming device 12 may determine that the view access rights associated with the user is limited to visualizations corresponding to operations of the station 20. In some embodiments, the authenticated credentials may provide subscription information that details the view access rights available to the user. In such cases, the data streaming device 12 may determine the view access rights based on the subscription information.

Using the same example described above, at block 158, the data streaming device 12 may send a list of devices associated with the access rights to the user. For example, the list of devices may include devices associated with the station 20 but excludes devices associated with the station 16 based on the determined view access rights of the user, as described at block 156. In this way, visualizations associated with devices on the plant floor may or may not be the same visualizations live-streamed to the user.

At block 160, the data streaming device 12 may receive a selection of a device from the user. Still using the same example described above, the user may select a bottle sealing machine at the station 20 from the list of devices associated with the access rights sent by the data streaming device 12. The user may send the selection of the bottle sealing machine to the data streaming device 12 via some user device. Additionally or alternatively, after viewing the list of devices associated with the access rights, the user may also send an additional request with additional credentials (e.g. an authorization with a supervisor identification) that may be used by the data streaming device 12 to determine additional view access rights using the operations described above (e.g., at blocks 154 and 156). If the additional credentials are authenticated, the data streaming device 12 may send an additional list of devices (e.g., a bottle washing machine at station 16) to the user for a new selection.

Based on received user selections (e.g., selecting a specific device, and/or selecting a particular visualization associated with the specific device), at block 162, the data streaming device 12 may send a list of visualizations associated with the device to the user. The user may review the list of visualizations and determine a visualization. The user may then send a selection of the determined visualization associated with the device to the data streaming device 12.

At block 164, the data streaming device 12 may receive the selection of the visualization from the user. Based on received selection of the visualization, the data streaming device 12 may receive the selected visualization data from the selected device (e.g., via an industrial control system governing the selected device) into seamlessly real-time data (e.g., streaming image data). That is, the selection of the visualization may correspond to a graphical user interface visualization, a dashboard visualization, an operational status visualization, real-time image data acquired by an image sensor (e.g., camera, video camera), or other suitable image data that presents information related to the equipment associated in the selected visualization.

At block 166, the data streaming device 12 may broadcast the selected visualization to the user device that transmitted the request. As such, the user may view the streaming image data in real time. The streaming image data may allow the users to utilize and act upon the streaming image data in a real time and secured manner without delay (e.g., caused by data downloading).

By providing governed view access rights to the streaming image data representative of operational data of industrial equipment, the method 150 described herein may be used in various industrial automation systems to prevent substantive datasets from being transmitted and stored via network devices, thereby reducing abilities of unauthorized users (e.g., hackers) from retrieving or intercepting the streaming image data.

With the preceding in mind, and to provide further familiarity with the method described above, FIG. 4 illustrates example live streaming visualizations 200 based on the method 150 of FIG. 3. The live streaming visualizations 200 may include operation status of equipment on a plant floor of the industrial automation system 10. A user (e.g., plant operator from the control room 52) may send a request with credentials for accessing certain plant floor datasets associated with visualizations corresponding to operations of equipment at the station 16 (e.g., washing station). After authenticating the credentials of the user and receiving user selections (e.g., a first selection indicating that water tanks 202, 212, 222, and 232 are interested, a second selection indicating that visualizations of temperature and pressure values associated with the selected water tanks are interested), the data streaming device 12 may route streaming image data associated with the selected visualizations to the user device (e.g., from the one or more computing systems 80). The visualizations may mirror the visualizations presented via the industrial control systems 11 that may be on site or they may be visualizations that are not currently being presented by the industrial control systems 11 but are prepared by the industrial control systems 11. The streaming image data may allow the users to utilize and act upon the streaming image data in a real time and secured manner without delay (e.g., delay caused by data downloading).

For instance, by observing the streaming image data, the user may notice that a visualization 234 representative of real-time tank 232 temperature value shows the temperature value of water in the water tank 232 is 40 degree that is above a threshold value (e.g., 10 degree). The user may record time information related to the water tank 232 showing abnormal temperature value based on a visualization 242 representative of current date and time. The user may then check water temperatures of the other water tanks, such as the water tanks 202 and 222, by observing a visualization 204 representative of real-time tank 202 temperature value and a visualization 224 representative of real-time tank 222 temperature value. Based on the visualizations, the user may determine that the water temperature in water tank 232 is higher than the water temperatures (e.g., 5 degree) in other water tanks (e.g., water tanks 202 and 222) at the station 16.

Additionally, or alternatively, the user may check water pressures of certain water tanks (e.g., the water tanks 202, 212, and 232). For example, by selecting an input 244 on the human machine interface 56 presenting the example live streaming visualizations 200, the user may be directed to a second display (e.g., display 2) to observe visualizations 206, 216, and 236 representative of real-time water pressure values of the corresponding water tanks 202, 212, and 232. Based on the visualizations on the second display, the user may determine that the water pressure value in water tank 232 is rising with respect to time while the water pressure values in the water tanks 202 and 212 remain stable with respect to time. The visualizations associated with both the temperature values and pressure values in different water tanks may provide confidence for the user to make further decisions related to the operations at the station 16. For example, the user may use the one or more computing systems 80 to send a command to cause a local controller connected to the water tank 232 to suspend operations related to the water tank 232. The other water tanks 202, 212, and 222 may continue operations while the water tank 232 is suspended for further actions (e.g., diagnose, fixing).

In this illustrated example, the live streaming visualizations 200 enabled by the live streaming image data routed by the data streaming device 12 allows the user to remotely monitor the operations at the station 16 on the plant floor of the industrial automation system 10. Such monitored operations include real-time water temperature values and water pressure values of the water tanks 202, 212, 222, and 232 that may change over a time period. The changes may prompt the user to take further actions, such as additional monitoring, suspending corresponding equipment, diagnosing or troubleshooting, replacing or repairing corresponding equipment, and the like. The data presented in the live streaming visualizations 200 is pure image data (e.g., pictures) containing no real values associated with the represented equipment. As such, when the live streaming visualizations 200 is accessed by unauthorized personnel (e.g., hackers) during an unexpected event (e.g., a security bridge), it is difficult for the unauthorized personnel to interpret the image data and glean or systematically (e.g., automatically) collect information related to the values presented in the image data. That is, the live streaming visualizations described in present disclosure provide data security that allows the users of industrial automation systems to utilize and act upon the live streaming data in a secured and real time manner.

In some cases, multiple users may be interested in viewing image data associated with the real time operation status of equipment on the plant floor of the industrial automation system 10. By presenting live streaming visualizations (e.g., similar to or different from the live streaming visualizations 200 depending on user credentials) via the data streaming device 12, each user of the multiple users may avoid gaining access to a respective port of a control system or device that outputs the image data, thereby reducing the network latency and network bandwidth provided to each user. Instead, any suitable number of individual users may view the image data without affecting the network latency or available bandwidth of the control system or device.

In some embodiments, a computing system may extract historical data from received streaming data based on certain identified data fields. The streaming data may include image data (e.g., image frames) and audio data (e.g., audio packets). The computing system may associate the audio packets with the image frames and extract one or more portions of the image frames based on the identified data fields. Such data fields may vary over a time period and be identified by using, for example, optical character recognition (OCR) technology. The computing system may acquire data field values based on the extracted portions of the image frames and identify audio packets corresponding to the image frames associated with the extracted portions. The acquired data field values and the identified audio packets may be stored as time series data in a database.

Figure 5:
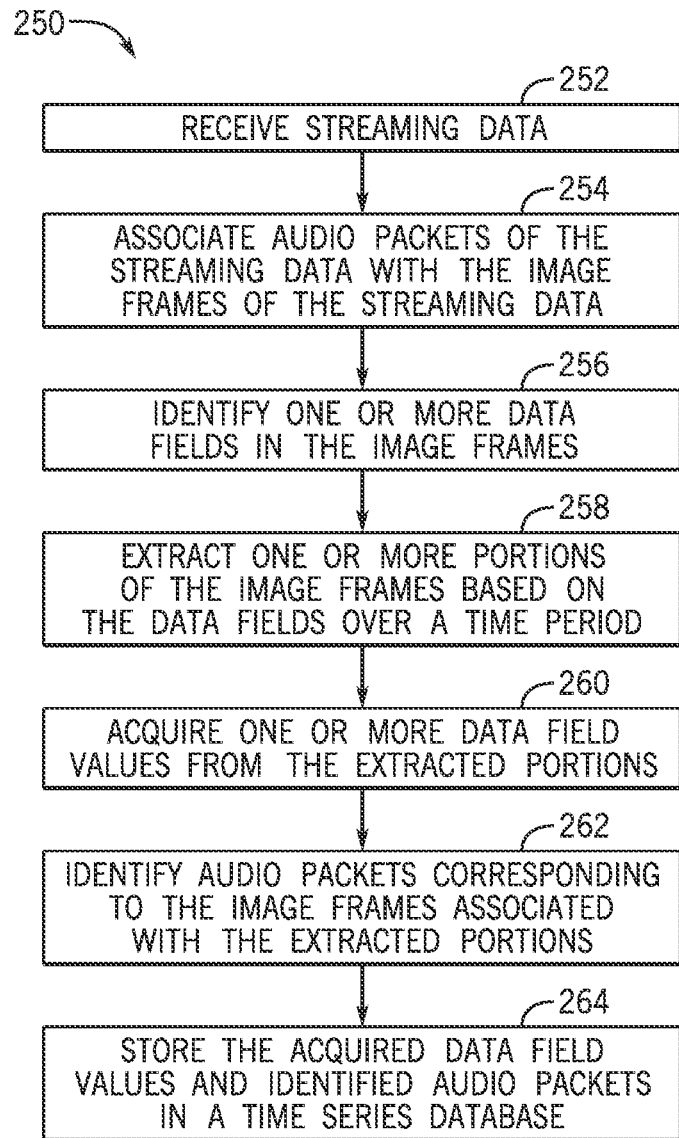
FIG. 5 illustrates a flow chart of an example method for extracting historical data from the live streaming data, in accordance with an embodiment presented herein.

With the preceding in mind, FIG. 5 illustrates a flow chart of an example method 250 for extracting historical data from the live streaming data. A computing system (e.g., from the one or more computing systems 80) may perform operations described below via one or more processors based on processor-executable code stored in one or more memory devices and one or more storage devices. The one or more processors may execute the processor-executable code to perform operations, such as associating audio packets with image frames, identifying certain data fields, extracting portions of the image frames based on the identified data fields, acquiring data field values based on the extracted portions, identifying audio packets corresponding to the extracted image frames, and storing the acquired data field values and identified audio packets as time series data in a database.

Although the method 250 described in FIG. 5 is described in a particular order, it should be noted that the method 250 may be performed in any suitable order and is not limited to the order presented herein. It should also be noted that although each processing block is described below in the method 250 as being performed by the computing system from the one or more computing systems 80, other suitable computing systems or devices (e.g., systems or devices connected to the network 60) may perform the methods described herein.

Returning to FIG. 5, at block 252, the computing system may receive the streaming data. The streaming data, as discussed above, may be transmitted via a streaming device (e.g., the data streaming device 12) using data generated by various sources (e.g., industrial automation devices, controllers, sensing devices) in various formats and volumes. In some embodiments, the streaming data may include audio data that is associated (e.g., synchronized) with image data in the streaming data. For example, a camera (e.g., a camera with audio sensors) may be positioned in front of a system or device (e.g., control system, control panel, door assembly, or the like). The image data and audio data associated with the system or device and acquired by the camera may be made available via the live-streaming device for view by users. In some embodiments, the image data and the audio data may be acquired by different devices (e.g., a camera and an audio sensing device). The computing system may receive the image data and the audio data are via certain data ports and may use the same amount of bandwidth regardless of whether the audio data is present or not.

In some embodiments, the image data may include image frames. For example, the image data may be broadcast at a refresh rate (e.g., 60, 70, 80, or 100 Hz), such that during each second that the image data is displayed, a number (e.g., 60, 70, 80, or 100) of image frames are presented. The individual image frames may not be perceivable by the user (e.g., via human eye) at the refresh rates used by the display and transmitted by the streaming device. However, a viewing device (e.g., computer, tablet) displaying the streaming image data may be capable of detecting certain features (e.g., interlaced machine-readable images) that may be embedded between the image frames using certain technologies (e.g., sampling the streaming image data at a specific rate comparable to the refresh rate).

In some embodiments, the audio data may include audio packets. The audio packets in the audio data may be associated with the image frames in the image data. For example, a camera positioned in front of the water tank 202 of FIG. 4 may acquire image frames based on a pressure display panel of the water tank 202. An acoustic sensor positioned close to an outlet valve of the water tank 202 may acquire audio packets based on acoustic waves arriving at the acoustic sensor. The arriving acoustic waves may include sound profiles of the water tank 202, voices within the vicinity of the water tank 202, or the like. When the pressure of the water tank 202 increases (e.g., due to increased water temperature inside the water tank 202), a noise associated with the increase water tank pressure and presented in the acoustic waves may be acquired by the acoustic sensor and a corresponding noise pattern may be recorded in certain audio packets.

In some embodiments, the image data and the audio data may be synchronized. For example, each of the image frames may be assigned with a time tag or stamp (e.g., containing the time when the image frame is acquired), and each corresponding audio packet may be assigned with the same time tag during broadcasting of the streaming data. For a different example, each of the image frames may be assigned with a unique number (e.g., serial number or frame number related to the time when the image frame is acquired), and each corresponding audio packet may be assigned with the same unique number during the broadcasting. Some identifiers (e.g., text, number related to time tag/stamp) may be presented in pictures of equipment display panels and other identifies (e.g., image frame number) may be superimposed on images (e.g., broadcasted streaming image data).

After receiving the streaming data, at block 254, the computing system may associate the audio packets of the streaming data with the image frames of the streaming data. In some embodiments, the computing system may associate the audio packets with the corresponding image frames based on the time tags assigned to the audio packets and the image frames. In some embodiments, the computing system may associate the audio packets with the corresponding image frames based on unique numbers assigned to the audio packets and the image frames.

At block 256, the computing system may identify one or more data fields in the image frames. For example, by monitoring the streaming data, such as the live streaming visualizations 200 of FIG. 4 that may include operation status of water tanks at station 16, a user (e.g., plant operator) may notice a type of noise associated with the water tank 232 being presented in the audio data of the streaming data. The user may send a command to the computing system to analyze portions of the image frames associated with the water tank 232, such as the portions of the image frames that include a tank temperature display panel. By analyzing the image frames over a time period (e.g., from a predetermined time, such as 3 minute, 5 minutes, or 10 minutes, prior to the time receiving the command to the present time), the computing system may track the tank temperature value and and determine that the tank pressure value is increasing in a particular time window (e.g., from 2 minutes prior to the commanding time to the present time), indicating a potential issue occurred to the water tank 232.

In addition to using user input, in some embodiments, the computing system may monitor the received image data and detect portions of the image data that changes. That is, in a display panel visualization, the portions of the image data between variable data values may remain the same for a certain period of time, while other portions of the image data may change due to changing values or measurements corresponding to status updates or changes.

After identifying the one or more data fields, at block 258, the computing system may extract one or more portions of the image frames based on the data fields over a time period. For example, based on the data analysis at block 256, the computing system may extract a portion of the image data associated with measurements related to the water tank 232 within the particular time window indicating the rising tank temperature and tank pressure.

At block 260, the computing system may acquire one or more data field values from the extracted portions of the image data. In some embodiments, the computing system may use the extracted portions in the time period and corresponding reference data to acquire the one or more data field values. For example, the computing system may use the reference data (e.g., specifications and settings of the water tank 232, pressure sensors and temperature sensors connected to the water tank 232) to derive or interpret real values (e.g., temperature value, pressure value) corresponding to the extracted images. As mentioned previously, the image data of streaming data contains image data that excludes substantive data or measurements (e.g., temperature or pressure reading) of operation-related values. Therefore, even if the image data is compromised (e.g., hacked), without the knowledge (e.g., the reference data) of the corresponding equipment or devices, it is difficult for unauthorized personnel to access the substantive values presented (e.g. displayed) in the image data.

In some embodiments, the computing system may include an optical character recognition (OCR) tool that may identify the one or more data field values from the streaming data and store the identified field values in a time series database. For example, the OCR tool may be capable of converting images of text (e.g., presented in pictures of equipment display panels) and/or subtitle text superimposed on images (e.g., broadcasted streaming image data) into machine-encoded text.

The identified field values may be captured at various intervals and may include an associated frame number or time stamp that provides temporal context to the data values. The data capture process may enable the unstructured data (e.g., image data) presented in the images to become structured data (e.g., time series data). In some embodiments, the computing system may include an artificial intelligence or machine learning module that may learn (e.g., based on historical data) to identify data fields in different visualizations provided by different sources (e.g., automation devices, controllers, or sensing devices) of the streaming data.

At block 262, the computing system may identify audio packets corresponding to the image frames associated with the field values. For example, the computing system may determine a time range associated with the extracted portions of the image data based on the time tags assigned to the extracted portions. The computing system may then identify the audio packets corresponding to the extracted portions based on the time tags assigned to the audio packets that are within the time range. In another example, the computing system may determine a unique number range (e.g., containing unique serial numbers or frame numbers) associated with the extracted portions based on the unique numbers assigned to the image frames of the extracted portions. The computing system may then identify the audio packets (e.g., over a period of time) corresponding to the extracted portions of the image data based on the unique numbers assigned to the audio packets that are within the unique number range.

At block 264, the computing system may store the acquired data field values and identified audio packets in a time series database. For instance, the computing system may include an optical character recognition (OCR) tool that may acquire the data field values from the streaming data, transform the acquired data field values into time series image datasets, and store the digital values in time series datasets. The stored time series image may be utilized by the computing system or other computing systems or devices for analyzing, plotting (e.g., plotting temperature vs. time diagrams), programing (e.g., designing a GUI showing modeling result based on pressure values), and the like. Moreover, the audio data that corresponds to the data field values may also be stored in a database (e.g., separate or the same) with a pointer or some other reference tool associating the audio data with corresponding data field values. In this way, the audio data associated with the acquired data field values may be accessible for playback to better understand the data field values.

In some embodiments, image data from a separate image data source (e.g., camera) may be received and associated with the acquired data field values. That is, a video camera or security camera acquiring image data related to the physical components being monitored in the visualizations represented by the streaming data may be received by the computing system and associated with the acquired data fields as described above. In this way, image data related to the operations of equipment associated with the acquired data fields may be available for access upon request.

In some embodiments, the computing system may apply certain data processing techniques, such as filtering (e.g., bandpass filtering) and applying a Fourier Transform, to acquired audio data (e.g., audio packets) and store digital representations of audio data in the database. In some embodiments, the identified audio packets may be stored along with the acquired data field values, such that the users may have access to sound profiles of certain events that occur prior to warnings or alarms associated with corresponding devices being reached or instances. For example, an acoustic sensor positioned close to an outlet valve of a water tank may acquire audio packets based on acoustic waves emitted from the water tank. A camera positioned in front of the water tank may acquire image data based on a pressure display panel of the water tank, and the OCR tool may be used to acquire the data field values (e.g., tank pressure values) based on the image data. The acquired audio packets and data field values may be stored as time series audio datasets and time series datasets (e.g., as digital values), respectively. By storing the datasets as described above, the users may have access to sound profiles of certain events (e.g., noise patterns associated with increasing water tank pressure) that corresponds to changes in data that may be tracked or detected based on trend analysis or other analysis performed on the acquired data field values. Such events may occur prior to warnings or alarms (e.g., water pressure being above a threshold pressure value) associated with corresponding devices (e.g., water tank) being reached or instances. The identified audio packets with the corresponding acquired data field values may provide precautionary information for enabling preventive operations. For example, based on the noise patterns and the acquired water tank pressure value, a plant operator or the computing system may send a command to a water tank controller to suspend operations of a water tank having the noise patterns and increasing water pressure. Such operations may prevent the water tank from being over pressure.

By providing structured data (e.g., time series datasets), the method 250 described herein may be used in various industrial automation systems in which unstructured data (e.g., image data) presented via live stream visualizations may be captured and stored in a structured format for further data processing and analysis. For instance, the same computing system or a different computing system may receive time series data from the data base and identify certain data trends associated with respective equipment or devices based on received time series data. The computing system may predict certain operational parameters of the respective equipment or devices based on identified trends. If a predicted operational parameter of an equipment is outside an expected range (e.g., predetermined range based on historical data), the computing system may send corresponding commands to the equipment to adjust corresponding operations.

Figure 6:
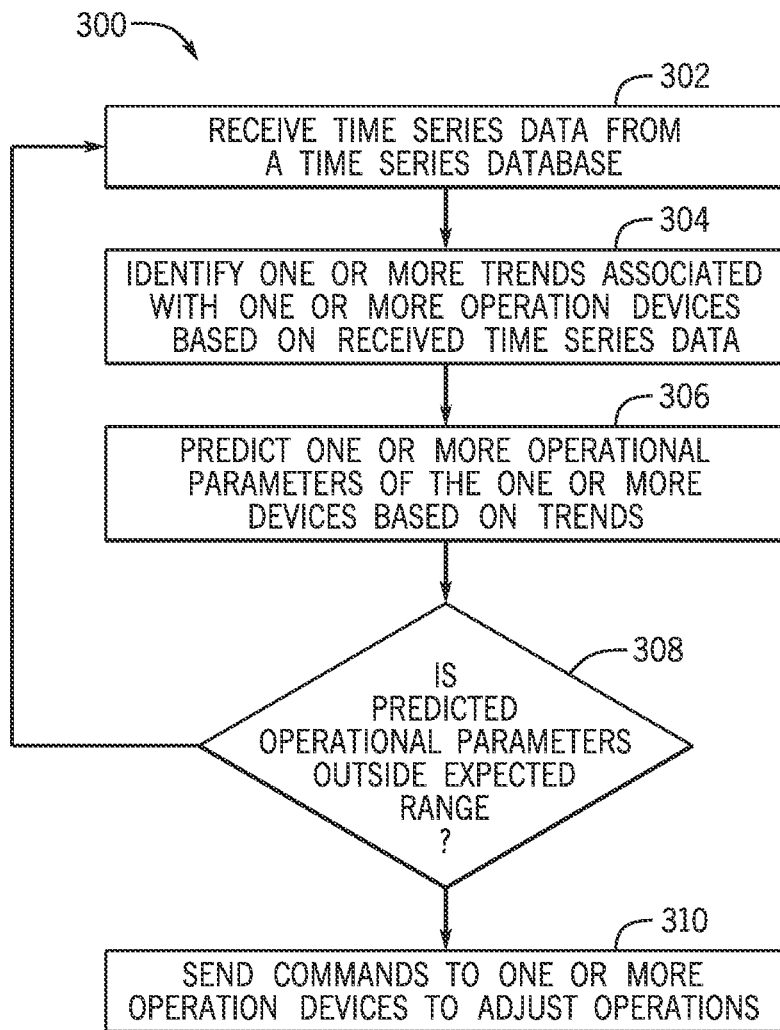
FIG. 6 illustrates a flow chart of an example method for identifying data trends based on extracted historical data using the example method of FIG. 5, in accordance with an embodiment presented herein.

With the foregoing in mind, FIG. 6 illustrates a flow chart of an example method 300 for identifying data trends based on extracted historical data using the example method 250 of FIG. 5. A computing system (e.g., from the one or more computing systems 80), which may or may not be the same computing system used by the example method 250 of FIG. 5, may perform operations described below via one or more processors based on processor-executable code stored in one or more memory devices and one or more storage devices. The one or more processors may execute the processor-executable code to perform operations, such as receiving time series data from a data base, identifying data trends based on received time series data, predicting operational parameters of based on identified trends, and sending commands to equipment to adjust corresponding operations when determining a predicted operational parameter of the equipment is outside an expected range.

Although the method 300 described in FIG. 6 is described in a particular order, it should be noted that the method 300 may be performed in any suitable order and is not limited to the order presented herein. It should also be noted that although each processing block is described below in the method 300 as being performed by the computing system from the one or more computing systems 80, other suitable computing systems or devices (e.g., system or devices connected to the network 60) may perform the methods described herein.

Returning to FIG. 6, at block 302, the computing system may receive time series data from a time series database. The time series data may include image data, audio data, and other types of data representative of live operational parameters or status of industrial devices. In some embodiments, the computing system may constantly receive time series data associated with operations of a corresponding industrial automation system. In some embodiments, the computing system may periodically (e.g., based on a predetermined time interval, such as every 30 second, 1, 3, 5, or 10 minutes) receive the time series data. In other embodiments, the computing system may receive the time series data after being trigged by certain events (e.g., increasing temperature detected, over pressure warning received, user request received).

After receiving the time series data from the time series database, the computing system may perform various types of analysis (e.g., trend analysis, predictions) based on the time series data. For example, at block 304, the computing system may identify one or more trends associated with one or more operation devices based on received time series data. In some embodiments, the computing system may utilize certain hardware components (e.g., neural network-based machine learning circuitry) and/or software components (e.g., analytic algorithms, machine learning algorithms) to identified the one or more trends associated with one or more operation devices.

For example, by analyzing the received time series data that includes time series data associated with a conveyor motor driving a conveyor at a convey section (e.g., the conveyor section 14 in the industrial automation system 10), the computing system may identify a trend associated with the conveyor motor. The time series data may be created based on image data of a display panel of a motion sensing device (e.g., including motion sensors, Light Detection and Ranging (LiDAR) sensors) monitoring the conveyor motor. The motion sensing device may detect positions and position changes of the conveyor motor with respect to a base where the conveyor motor sits. The values associated with the detected positions and position changes may be displayed on the display panel. The visualizations of the display panel may be provided to a data streaming device (e.g., data streaming device 12) via a controller (e.g., convey motor controller). The data values associated with the detected positions may be acquired using the method 250.

In some embodiments, the time series audio data may include acoustic waves emitted from the conveyor motor. The computing system may convert the detected acoustic waves into digital or data signals (e.g., frequency domain). The signals may be analyzed to identify trends or other features that may be present in the data.

That is, in some embodiments, the computing system may identify a particular noise pattern (or signature) in the received time series audio data. For example, the computing system may use, for example, audio mode recognition and machine learning, to compare the sound profile (e.g., via Fourier Transform) in the time series audio data to reference audio data stored in a database that contains different noise patterns corresponding to different faulty operations of the conveyor motor identified in an operational history of the conveyor motor identified and/or similar motors used elsewhere). Based on the comparison, the computing system may determine that the particular noise pattern correspond to an offset of the conveyor motor. Next, the computing system may retrieve a portion of the time series data (e.g., values) corresponding to the portion of time series audio data having the particular noise pattern. The retrieved portion of time series data may include data that represent a position change (e.g., an offset) for the conveyor motor with respect to the base. The computing system may use, for example, machine learning, to identify that an increasing trend associated with the operation of the conveyor motor.

Based on the one or more identified trends, at block 306, the computing system may predict one or more future operational parameters of the one or more devices based on the trends. In some embodiments, the computing system may utilize certain hardware components (e.g., e.g., artificial intelligence (AI) based processing circuitry) and/or software components (e.g., artificial intelligence algorithms) to predict the one or more operational parameters. Using the same example described above, based on the identified trend indicating potential increasing offset values of the conveyor motor, the computing system may predict an offset increasing range (e.g., from 5 mm to 10 mm) within a time period (e.g., next 1, 1.5, or 2 hours).

At block 308, the computing system may determine whether the predicted one or more operational parameters are outside one or more expected ranges. Using the same example as above, if the computing system determines that the predicted offset value (e.g., 5 mm) within 1 hour may be outside an expected range (e.g., from 2 mm to 4 mm, a predetermined range based on historical offset values measured by the motion sensing device), at block 310, the computing system may send commands to the one or more operation devices (e.g., the conveyor motor controller) to adjust corresponding operations (e.g., reducing motor speed, or suspend the conveyor motor). In some embodiments, certain historical values (e.g., motor speed, water pressure) based on historical data (e.g., historical operation data associated with the industrial devices) may be used to set alarm limits based on the average values over a period of time. If an alarm limit has been exceeded, the computing device may send a notification (e.g., email, text message, and annunciation signal) to certain devices or components to alert one or more users.

In certain embodiments, a control system (e.g., industrial control system) may receive datasets from operation equipment or devices of an industrial system. Based on the received datasets, the control system may generate machine-readable images (e.g., Quick Response (QR) codes, bar codes) representative of the datasets and interlace the machine-readable images with the streaming image data provided to users for view via a data streaming device. Such interlaced machine-readable images may be detectable by certain computing devices but may not be perceivable by the user. In this way, additional information may be embedded within image frames of the streaming image data and provided to the user via broadcast. In some cases, interlaced data may be used to provide additional data while streaming the visualization images.

Figure 7:
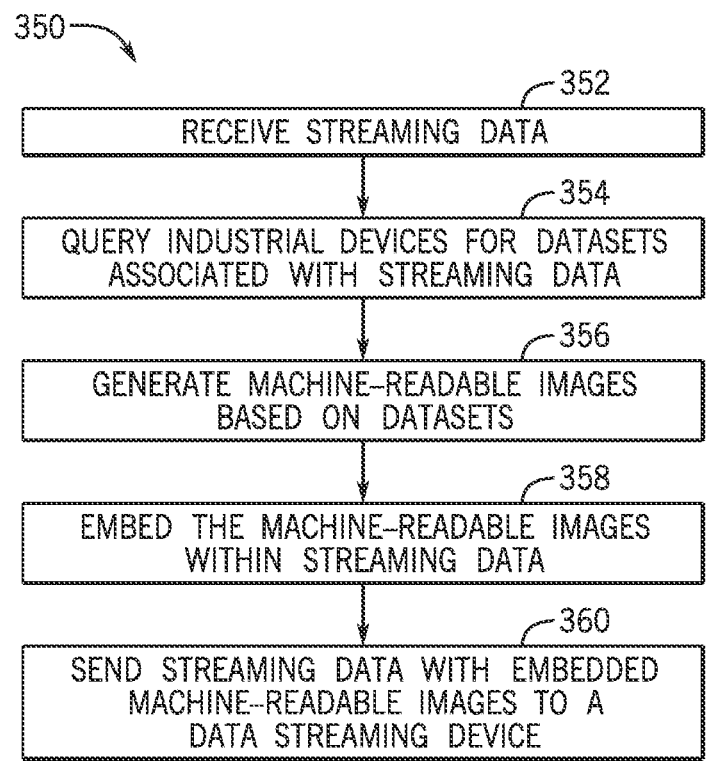
FIG. 7 illustrates a flow chart of an example method for interlacing data in the live streaming data, in accordance with an embodiment presented herein.

With the preceding in mind, FIG. 7 illustrates a flow chart of an example method 350 for interlacing data in the live streaming data. A control system (e.g., from the one or more industrial control systems 11) may perform operations described below via one or more processors based on processor-executable code stored in one or more memory devices and one or more storage devices. The one or more processors may execute the processor-executable code to perform operations, such as receiving streaming data, querying the industrial devices for datasets associated with the streaming data, generating machine-readable images based on the datasets, embedding the machine-readable images within the streaming data, and sending the streaming data with embedded machine-readable images to a data streaming device. In some embodiments, the operations may include interlacing a buffer of machine-readable images within the streaming data (e.g., consisting of image frames) and retrieving a missing machine-readable image from one or more neighboring image frames.

Although the method 350 described in FIG. 7 is described in a particular order, it should be noted that the method 350 may be performed in any suitable order and is not limited to the order presented herein. It should also be noted that although each processing block is described below in the method 350 as being performed by the control system from the one or more industrial control systems 11, other suitable control systems or devices (e.g., system or devices connected to the industrial automation system 10) may perform the methods described herein.

Returning to FIG. 7, at block 352, a control system may receive streaming data from industrial devices of an industrial system. For example, the control system may be one of the one or more industrial control systems 11. The control system may generate visualizations each representative of live operational parameters associated with industrial devices, determine access rights to each of the visualizations based on a request containing credentials associated with a requester, identify one or more of the visualizations based on the access rights, obtain a selection of the one or more of the visualizations from the requester, and receive streaming data containing the selected visualizations, in accordance with embodiments described above.

After receiving the streaming data, at block 354, the control system may query the industrial devices for datasets associated with the streaming data. That is, the control system may query various data sources to identify datasets that may be associated with one or more devices presented via the streaming data. In some embodiments, the streaming data may be associated with certain devices presented therein. That is, the streaming data may include metadata or associations to datasets acquired by sensors or produced by other devices. In addition, a user or the control system may define the datasets associated with the streaming data.

For example, a motor (e.g., conveyor motor) may have an operation speed of 3000 revolutions per minute (RPM) and the streaming data may include a visualization indicative of a measurement of a motor speed sensor that may detect the current operation speed of the motor. In some embodiments, the motor speed sensor may be associated with the streaming data as one of the data sources being represented by the streaming data.

In some embodiments, the control system generating the streaming data may receive data from sensors being above some threshold. Here, the control system may identify the corresponding datasets to embed with the streaming data to convey the respective condition or data values.

With this in mind, in addition to generating and transmitting the streaming data, the control system may query the corresponding industrial devices for datasets in response to detecting certain warnings or alerts. For example, some warnings or alerts may be triggered by detecting/identifying certain operational parameters associated with the industrial devices are different from device settings, or above/below pre-determined threshold values or threshold ranges as described above. In some embodiments, the control system may query the corresponding industrial devices for datasets in response to certain input, such as requests from users (e.g., plant operator), indications from other computing systems (e.g., computing systems 80) that may identify abnormal changes associated with operational parameters of the industrial devices based on analyzing the streaming data.

At block 356, the control system may generate machine-readable images based on the datasets. The machine-readable images used herein may be referred to as bar codes (machine-readable optical labels such as UPC code), quick response (QR) codes (a type of matrix barcodes or two-dimensional barcode), or other suitable machine-readable image data formats that may contain information related to items to which they are associated (e.g., attached, linked). Such information may include location, identification, specification, status (e.g., operation parameters such as various device or sensor readings), other trackable data, and the like. For example, a QR code may contain up to 7089 characters of numerical data or 4296 alphanumerical characters that may be used to store live operational parameters associated with industrial devices. In some embodiments, the QR codes may use certain encoding modes, such as numeric, alphanumeric, byte/binary, kanji, or other extensions to store data efficiently.

After generating the machine-readable images, at block 358, the control system may embed the machine-readable images within the streaming data. As mentioned above, image data may be provided at certain frequency, such as 60 Hz or higher. However, the human eye may only perceive images that are presented at a lower frequency (e.g., 15 Hz). With this in mind, in some embodiments, datasets related to the operations of various equipment or devices, such as the live operational parameters associated with industrial devices, may be interlaced with the image data streamed via a live-streaming device (e.g., data streaming device 12). For instance, bar codes, QR codes, or some other machine-readable images may be interlaced with the image data provided to an end user for view and analyze. Such machine-readable images may include information related to changes in operations, firmware, or maintenance history associated with respective industrial equipment, devices, and machines. Additionally, or alternatively, the machine-readable images may include information of other industrial equipment, devices, and machines that may be related (e.g., connected) to the respective equipment, devices, and machines. The interlaced machine-readable image may not be perceivable by a human viewer, but the local computing system that displays the streamed image data may sample the streamed image data at a rate that enables it to capture the interlaced machine-readable image data. In some embodiments, the interlaced machine-readable image may be encrypted, such that the local computing system that receives the streamed image data may have access to a decryption tool to decrypt the machine-readable image.

In one embodiment, the image data associated with certain industrial devices (e.g., water tanks water tanks 202, 212, 222, and 232 of FIG. 4) may be provided at 60 Hz frequency, such that the end user (e.g., plant operator) may view and analyze 60 image frames per second. The control system may embed (e.g., superimpose) the machine-readable images within the image frames. The control system may embed the machine-readable images with certain image frames based on a pre-determined order. For instance, the control system may embed the machine-readable images with the 10th, 20th, 30th, 40th, 50th, and 60th image frames within the 60 image frames of each second. In each of the 10th, 20th, 30th, 40th, 50th, and 60th image frames, one or more (e.g., three) machine-readable images may be embedded with the corresponding image frames. Certain data redundancy (e.g., duplication or mirroring of data that helps prevent the data from missing or a device from becoming unavailable) may be added during a process of embedding the machine-readable images with the streaming data. For example, the control system may create a high-density image that includes a number of machine-readable images at different positions during one frame of the image data. Additional details with regard to interlacing data in streaming image data with added redundancy will be discussed below with reference to FIG. 8.

At block 360, the control system may send the streaming data with embedded machine-readable images to a data streaming device. For example, the control system, such as one of the one or more industrial control systems 11, may send the streaming data embedded with the machine-readable images to the data streaming device 12 via a communication port. The data streaming device 12 may route the streaming data to the end user for view and analyze.

Figure 8:
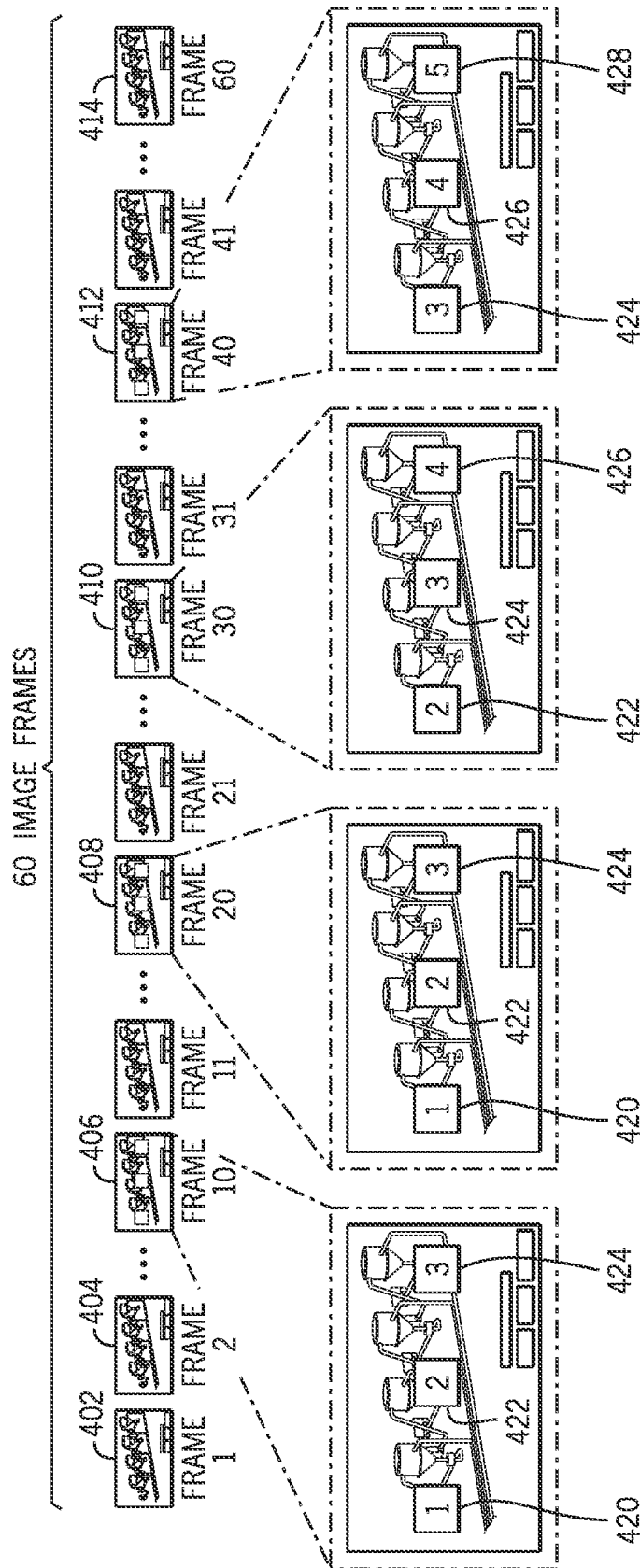
FIG. 8 illustrates an example of a number of image frames with interlaced data based on the example method of FIG. 7, in accordance with an embodiment presented herein.

FIG. 8 illustrates an example of a number of image frames with interlaced data based on the example method 350 of FIG. 7. A control system (e.g., one of the one or more industrial control systems 11) or a streaming device (e.g., the data streaming device 12) may provide image data (e.g., the live streaming visualizations 200 of FIG. 4) associated with certain industrial devices (e.g., water tanks 202, 212, 222, and 232 of FIG. 4) at 60 Hz frequency, such that the end user (e.g., plant operator) may view and analyze 60 image frames per second. For example, the 60 image frames may include image frames 402 (FRAME 1), 404 (FRAME 2), 406 (FRAME 10), 408 (FRAME 20), 410 (FRAME 30), 412 (FRAME 40), 414 (FRAME 60), and other intermediate image frames not shown. Each image frame may represent a live streaming visualization at a different time representative of live operational parameters (e.g., water pressure and/or water temperature) associated with water tanks (e.g., the water tanks 202, 212, 222, and 232).

As mentioned above, the control system or the streaming device may embed the machine-readable images (e.g., QR codes) with certain image frames based on a pre-determined order. For instance, the control system or the streaming device may embed the machine-readable images with the image frames 406, 408, 410, and 420 within the 60 image frames as illustrated. In each of the image frames 406, 408, 410, and 420, three machine-readable images may be embedded with the corresponding image frame. With the live streaming image data interlaced the machine-readable images that include data values or information being transmitted by the control system. As such, the control system may communicate additional information (e.g., certain operational parameters) associated with the industrial devices within the live streaming image data.

Additionally or alternatively, additional data may be added to improve data redundancy. In some cases, various network conditions may cause the streaming image data to be missing certain frames of the image data. As such, if the interlaced machine-readable image is part of the missing frame, the local computing system may not receive the expected datasets. To better ensure that the streaming image data will provide the expected datasets even when the transmitting device may lose network connectivity, the live-streaming device or other suitable component may create a high-density image that includes a number of machine-readable images at different positions during one frame of the image data. The collection of machine-readable images may correspond to a buffer of datasets. As the streaming image data continues to present image data via each subsequent frame, the frames that include the interlaced machine-readable images may move a new machine-readable image onto the frame and remove a previously presented machine-readable image off of the frame. As such, local computing system may receive a buffer of datasets via the machine-readable images, such that any missing frame may be identified based on how the machine-readable images cycle through the frames of image data. The missing frame may be accounted for and retrieved from a different frame.

For example, at the beginning of the 60 image frames, the image frame 406 and 408 may be embedded with the first, second and third machine-readable images 420, 422, and 424, such that certain information related to events (e.g., changes associated with the live operational parameters being detected at a beginning time) may be duplicated to prevent the information from missing (e.g., caused by network connectivity issues). As a subsequent image frame containing the machine-readable images, the image frame 410 may be embedded with different machine-readable images 422, 424, and 426. For example, in the image frame 410, the control system or the streaming device may move the first machine-readable image 420 out of the image frame 410 and push the fourth machine-readable image 426 into the image frame 410. As such cycling process continues, the next subsequent image frame containing the machine-readable images, the image frame 420 may be embedded with different machine-readable images 424, 426, and 428.

In some embodiments, the control system or the streaming device may include (e.g., superimposing) certain identifiers (e.g., code, image, or text) in the image frames containing the machine-readable images. For example, the identifiers may include numerical characters (e.g., in a pre-determined order) in each of the image frames containing the machine-readable images, such that a missing image frame containing the machine-readable images may be identified (e.g., by comparing the identifiers of two consecutive image frames containing the machine-readable images to identify a missing intermediate identifier representing a missing image frame).

Using the cycling process described above, certain data redundancy (e.g., duplication or mirroring of data that helps prevent the data from missing or a device from becoming unavailable) may be added during the process of embedding the machine-readable images with the streaming data. For instance, the beginning image frames containing the machine-readable images, such as the image frames 406 and 408, may be embedded with a same portion (e.g., the machine-readable images 422 and 424) of the machine-readable images as the subsequent image frame 410 containing the machine-readable images. Similarly, the image frame 410 may be embedded with an identical portion (e.g., the machine-readable images 424 and 426) of the machine-readable images as the subsequent image frame 420. In this way, the control system or the streaming device may create a high-density image including a number of machine-readable images at different positions during one frame of the image data.

Using interlacing data technique described above, a buffer of image datasets (e.g., a gather of high-density images consisting of machine-readable images) may be interlaced within the streaming image data, such that any missing image frames may be accounted for and retrieved from one or more neighboring image frames. In this way, the control system or the streaming device may utilize the machine-readable images interlaced with the streaming image data to ensure that the streaming image data may provide expected image datasets to the user during occurrences of various network issues.

For example, in present illustrated embodiment, the control system or the streaming device may identify the image frame 410 as a missing frame. The missing frame 410 may be identified by the control system or the streaming device by comparing identifiers of two consecutive image frames containing the machine-readable images, such as the image frames 408 and 420, to identify a missing intermediate identifier representing the missing image frame 410. The control system or the streaming device may use one or more neighboring image frames to retrieve missing machine-readable images associated with the missing image frame. For example, the control system or the streaming device may use the image frames 408 and 420 to retrieve the missing machine-readable images 422, 424, and 426 associate with the missing frame 410.

Figure 9:
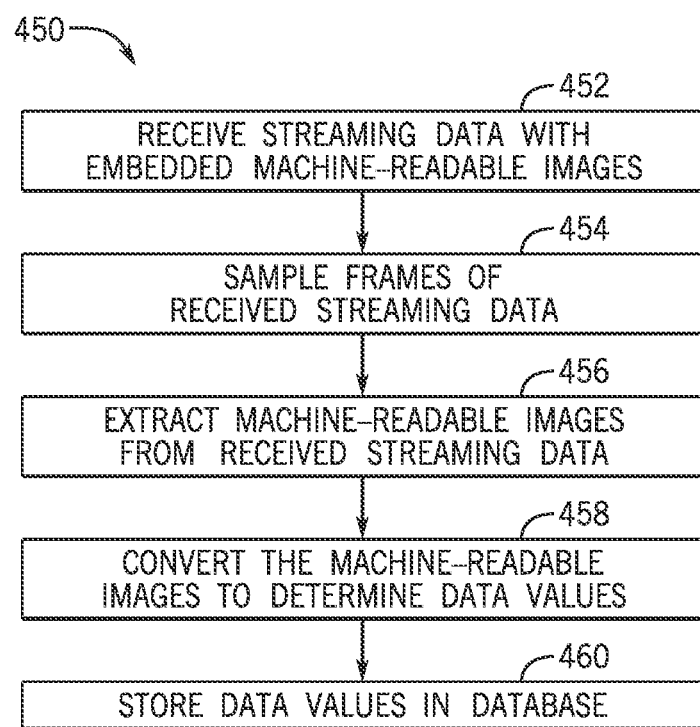
FIG. 9 illustrates a flow chart of an example method for processing the live streaming data with interlaced data, in accordance with an embodiment presented herein.

With the preceding in mind, FIG. 9 illustrates a flow chart of an example method 450 for processing the live streaming data with interlaced data. At block 452, a computing system (e.g., the computing systems 80) may receive streaming data with embedded machine-readable images. For example, the computing system may receive the streaming data with embedded machine-readable images (e.g., bar codes, quick response (QR) codes, or other suitable machine-readable image data formats) from a streaming device (e.g., the data streaming device 12). The streaming data may be provided as image frames by the streaming device at certain frequency (e.g., 60 Hz or higher frequencies). At least a portion of the image frames may be embedded with the machine-readable images as described in previous embodiments.

After receiving the streaming data with embedded machine-readable images, at block 454, the computing system may sample the image frames of received streaming data. for example, the computing system may sample the image frames at a pre-determined frequency (e.g., 60 Hz or higher frequencies) to retrieve individual image frames. Additionally or alternatively, the computing system may sample the image frames at a different pre-determined frequency (e.g., based on a per-determined order). For example, a control system or a streaming device may embed the machine-readable images (e.g. QR codes) with certain image frames based on the pre-determined order. Using the example described in FIG. 8, the control system or the streaming device may embed the machine-readable images (e.g., the machine-readable images 420, 422, 424, 426, and 428) with the image frames 406, 408, 410, and 420 within the 60 image frames in a given time period (e.g., one second). In each of the image frames 406, 408, 410, and 420, three machine-readable images may be embedded with the corresponding image frame.

At block 456, the computing system may extract machine-readable images from received streaming data. For example, the computing system may use the sampled image frames (from block 454) to extract the machine-readable images embedded in the sampled image frames. Such extracted machine-readable images may include additional information (e.g., certain operational parameters) associated with the industrial devices. In some cases, the extracted machine-readable images may include additional data that may be used to improve data redundancy.

With the extracted machine-readable images from received streaming data, at block 458, the computing system may convert the machine-readable images to determine data values. For example, the machine-readable images may include QR code consists of black squares arranged in a square grid on a white background, which may be read by an imaging device (e.g., a camera) coupled to the computing system. In some embodiments, the imaging device may use a QR reader tool to read the QR code. The computing system may perform certain data processing operations, such as using Reed—Solomon error correction to interpret the machine-readable images to convert the machine-readable images to determine data values corresponding to live operational parameters associate with the industrial devices. For example, the computing system may convert the machine-readable images and determine the data values based on certain patterns presented in horizontal and vertical components of the QR code.

At block 460, the computing system may store the data values in a database. For example, the computing system may store the data values as time series data corresponding to certain portions of image and/or audio data representing changes associated with live operation parameters (e.g., temperature, pressure, motor speed) of an industrial device. The computing system may use, for example, machine learning, to identify a trend associated with the operation of the industrial device and predict one or more future operational parameters of the industrial device based on the identified trend. In some embodiments, the computing device may identify a missing image frame and retrieve the missing machine-readable images associated with the missing image frames using a buffer of image datasets (e.g., a gather of high-density images consisting of machine-readable images) interlaced within the streaming image data.

In some embodiments, the interlaced image data may be used to verify the data acquired via OCR or some other technology. In this way, the OCR technology may be tuned to allow for improved data acquisition operations.

In some embodiment, the different methods described herein may be combined to facilitate remote accesses to live data updates related to various equipment or devices of a system by multiple users across an organization. For example, a control system may receive streaming data from industrial devices of an industrial system and query the industrial devices for datasets associated with the streaming data. Based on the datasets, the control system may generate machine-readable images and embed the machine-readable images within the streaming data. A data streaming device may receive the streaming data embed with the machine-readable images. The data streaming device may determine view access rights associated with a user of the multiple users based on authenticated credentials of the user and route live streaming image data containing selected visualizations associated with selected industrial devices to a computing system associated with the user. The live streaming image data may include serial image frames and the user credentials. Each image frame of certain portion(s) of the image frames may include a subset of the machine-readable images corresponding to a buffer of the datasets.

The computing system may identify one or more data fields in the image frames and extract one or more portions of the image frames based on the data fields over a time period. From the extracted portions of the image frames, the computing system may acquire one or more data field values and store the acquired data filed values in a time series database. The computing system may access the time series database to receive time series data and identify one or more trends associated with one or more industrial devices. Based on the trends, the computing system may predict one or more operational parameters of the one or more industrial devices and send commands to the one or more industrial devices to adjust operations if the predicted operational parameters are outside expected ranges. In some embodiments, the computing system may extract the machine-readable images from the live streaming image data and convert the machine-readable images to determine data values corresponding to live operational parameters associate with the industrial devices.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the embodiments described herein have been illustrated and described, many modifications and changes will occur to those skilled in the art. It is, therefore, to be understood that the appended claims are intended to cover all such modifications and changes as fall within the true spirit of the embodiments described herein.

The invention claimed is:

1. A system, comprising:
a control system configured to control one or more operations of one or more industrial devices in an industrial system, wherein the control system is configured to:
receive streaming data comprising one or more visualizations representative of one or more live operational parameters associated with the one or more industrial devices of the industrial system, wherein the streaming data comprises a plurality of image frames corresponding to live visualization data broadcast via a data streaming device, and wherein the one or more industrial devices are configured to perform one or more operations of an automated process for manufacturing one or more products;
query a first industrial device of the one or more industrial devices to retrieve a plurality of datasets comprising sensor data acquired via one or more sensors within the industrial system, wherein the first industrial device is represented within the streaming data;
generate a plurality of machine-readable images based on the plurality of datasets;
embed the plurality of machine-readable images within the plurality of image frames of the streaming data to generate updated streaming data; and
send the updated streaming data to a computing system configured to extract the plurality of machine-readable images from the updated streaming data, wherein the computing system is configured to adjust one or more operations of at least one of the one or more industrial devices based on the plurality of machine-readable images.

2. The system of claim 1, wherein the streaming data comprises metadata associated with the plurality of datasets.

3. The system of claim 1, wherein the plurality of datasets comprises data produced by the one or more industrial devices in the industrial system.

4. The system of claim 1, wherein the control system is configured to query the one or more industrial devices for the plurality of datasets in response to detecting one or more warnings, one or more alerts, or both.

5. The system of claim 4, wherein the one or more warnings, the one or more alerts, or both are triggered by detecting the one or more live operational parameters associated with the one or more industrial devices are different from one or more device settings, above or below one or more pre-determined threshold values, outside one or more threshold ranges, or any combination thereof.

6. The system of claim 1, wherein the plurality of machine-readable images comprises at least one bar code, at least one quick response code, or both.

7. The system of claim 1, wherein the plurality of machine-readable images is configured to convey information associated with one or more data values corresponding to the one or more live operational parameters associated with the one or more industrial devices.

8. The system of claim 1, wherein the plurality of image frames is presented to the computing system at a frequency higher than 15 Hz.

9. The system of claim 1, wherein the control system is configured to embed the plurality of machine-readable images within the plurality of image frames of the streaming data based on a pre-determined order.

10. The system of claim 9, wherein the computing system is configured to extract the plurality of machine-readable images from the updated streaming data based on the pre-determined order.

11. The system of claim 1, wherein the computing system is configured to:
   determine one or more data values corresponding to the one or more live operational parameters associated with the one or more industrial devices based on the plurality of machine-readable images extracted from the streaming data; and
   store the one or more data values in a database.

12. The system of claim 11, wherein the computing system comprises a quick code reader tool configured to determine the one or more data values, wherein the plurality of machine-readable images comprises at least one quick response (QR) code.

13. A method, comprising:
   receiving, via a control system, streaming data comprising one or more visualizations representative of one or more live operational parameters associated with one or more industrial devices in an industrial system, wherein the streaming data comprises a plurality of image frames corresponding to live visualization data broadcast via a data streaming device, and wherein the one or more industrial devices are configured to perform one or more operations of an automated process for manufacturing one or more products;
   querying a first industrial device of the one or more industrial devices to retrieve a plurality of datasets comprising sensor data acquired via one or more sensors within the industrial system, wherein the first industrial device is represented within the streaming data;
   generating, via the control system, a plurality of machine-readable images based on the plurality of datasets;
   embedding, via the control system, the plurality of machine-readable images within the plurality of image frames of the streaming data to generate updated streaming data; and
   sending the updated streaming data to a computing system, wherein the computing system is configured to adjust one or more operations of at least one of the one or more industrial devices based on the plurality of machine-readable images embedded within the plurality of image frames.

14. The method of claim 13, wherein the computing system is configured to extract the plurality of machine-readable images from the updated streaming data.

15. The method of claim 13, wherein each image frame of a portion of the plurality of image frames comprises a subset of the plurality of machine-readable images, and wherein the subset of the plurality of machine-readable images corresponds to a buffer of a plurality of datasets.

16. The method of claim 13, wherein a first image frame and a second image frame of a portion of the plurality of image frames comprises a first subset and a second subset of the plurality of machine-readable images, respectively, and wherein the first subset and the second subset of the plurality of machine-readable images comprise at least one matching machine-readable image.

17. Non-transitory, computer-readable medium storing instructions that, when executed by one or more processors, are configured to cause the one or more processors to perform operations comprising:
   receiving streaming data via a network, wherein the streaming data comprises a plurality of image frames including one or more visualizations of one or more live operational parameters associated with one or more industrial devices of an industrial system, wherein the streaming data is received from a data streaming device, and wherein the one or more industrial devices are configured to perform one or more operations of an automated process for manufacturing one or more products;
   extracting a plurality of machine-readable images from the plurality of image frames, wherein the plurality of machine-readable images corresponds to a portion of the plurality of image frames;
   determining one or more data values corresponding to one or more live operational parameters associated with one or more industrial devices based on the plurality of machine-readable images extracted from the streaming data, wherein the one or more industrial devices are represented within the streaming data, and wherein the one or more data values comprise sensor data acquired from one or more sensors within the industrial system;
   storing the one or more data values in a database; and
   sending one or more commands to the one or more industrial devices based on the one or more data values, wherein the one or more commands are configured to adjust one or more operations of the one or more industrial devices.

18. The non-transitory, computer-readable medium of claim 17, wherein each image frame of the portion of the plurality of image frames comprises a subset of the plurality of machine-readable images, and wherein the subset of the plurality of machine-readable images corresponds to a buffer of the one or more data values.

19. The non-transitory, computer-readable medium of claim 17, wherein a first image frame and a second image frame of the portion of the plurality of image frames comprises a first subset and a second subset of the plurality of machine-readable images, respectively, and wherein the first subset and the second subset of the plurality of machine-readable images comprise at least one matching machine-readable image.

20. The non-transitory, computer-readable medium of claim 19, wherein the first image frame and the second image frame corresponds to a pre-determined order with respect to the plurality of image frames.

* * * * *